Patented Feb. 19, 1929.

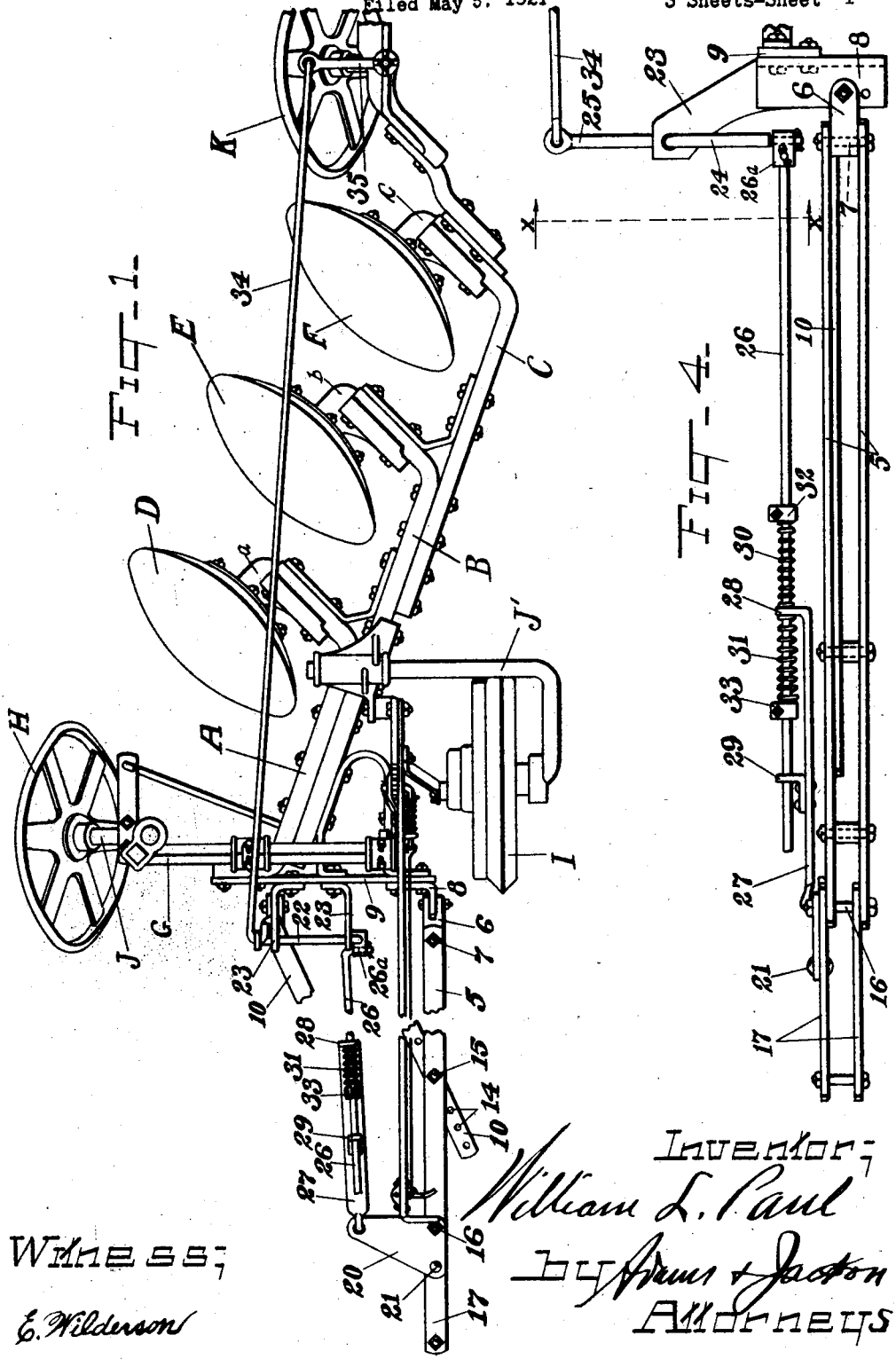

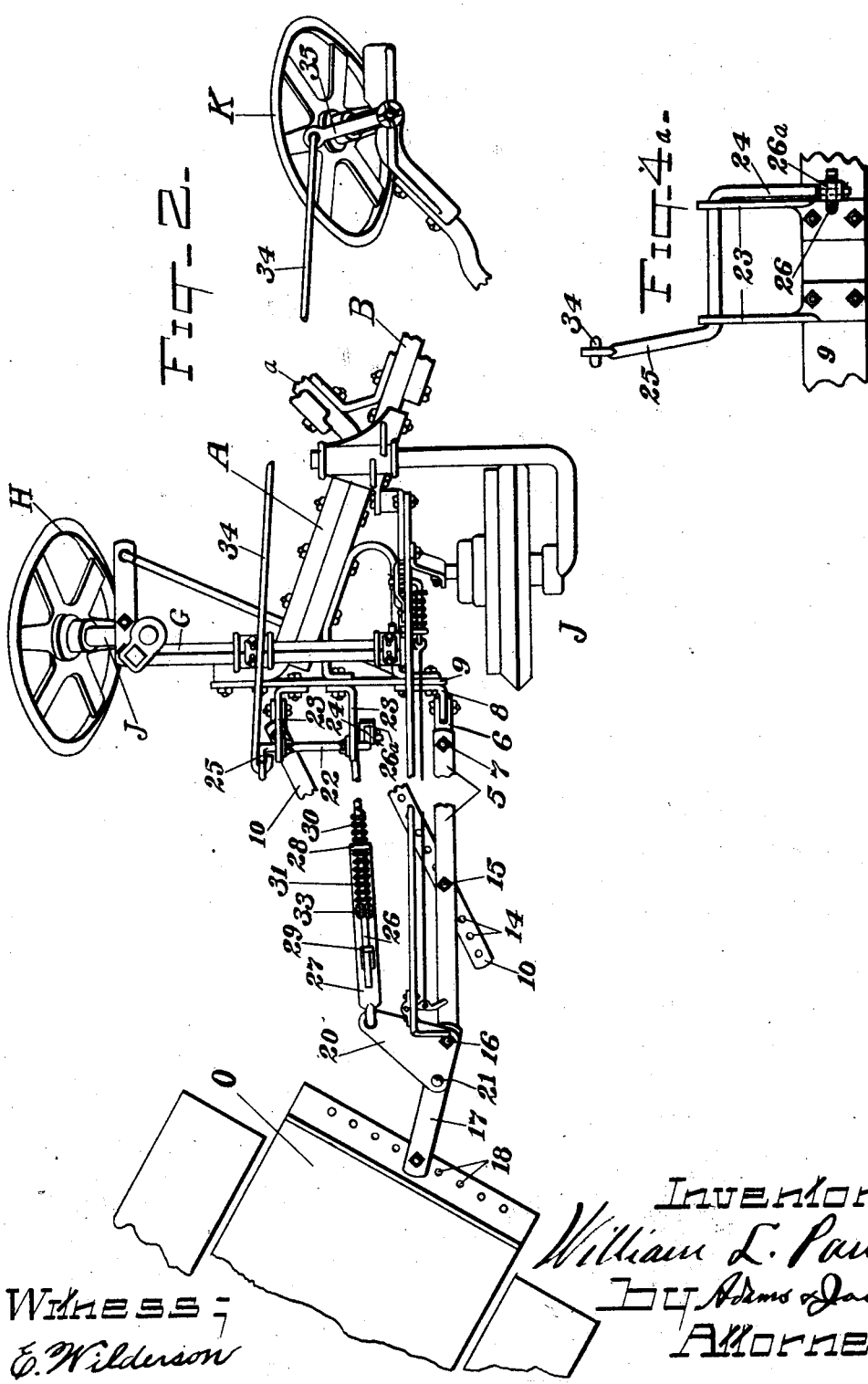

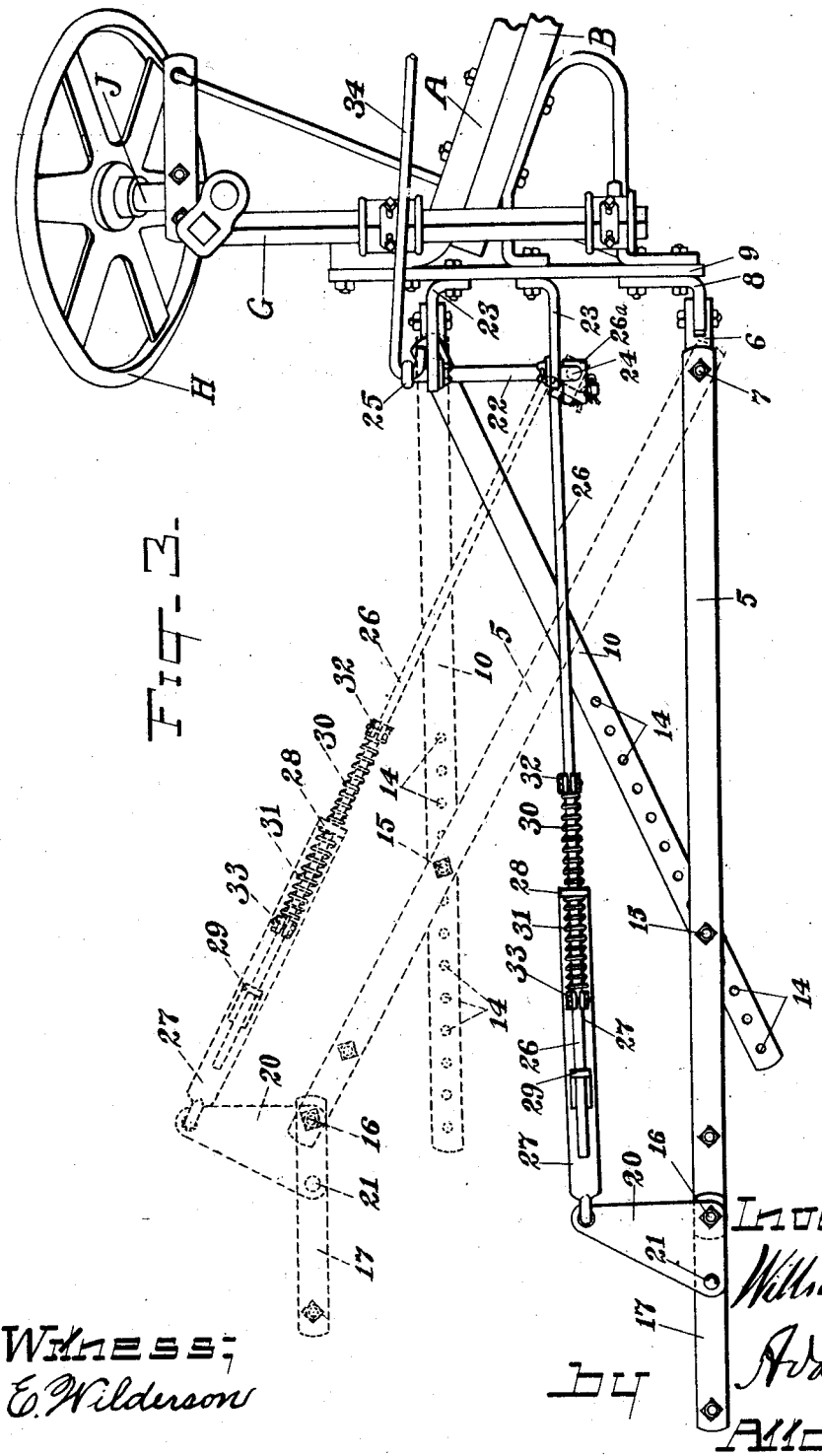

1,702,615

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

DRAFT ATTACHMENT FOR AGRICULTURAL IMPLEMENTS.

Application filed May 5, 1921. Serial No. 467,108.

This invention relates to an improved hitch and steering means primarily designed for use in connection with tractor-drawn wheeled agricultural implements, and is herein shown and described in connection with a disc plow. The object of the invention is to provide an improved combined hitch device and a steering mechanism associated therewith whereby the wheeled implement may be adjusted laterally to different positions relatively to the tractor to which it is attached without actuating or modifying the operation of the steering mechanism, and, in any of such adjusted positions, may be automatically swerved from a straightforward line of travel so as to correspond to similar movements of the tractor, and which will automatically and promptly counteract any tendency of the machine to be swerved out of a straightforward path, when the tractor is moving straight ahead, whether the machine is travelling directly in rear of the tractor or in one of its laterally-adjusted positions. In the accompanying drawings I have shown a construction and arrangement of parts whereby such object is effectively attained, and in the claims I have pointed out those things that I believe to be new. It is to be understood, however, that, except as specifically set forth in certain of the claims, I do not limit myself to the construction and arrangement of parts shown, as many variations therefrom may be made without departing from my invention. This application, however, is not intended to cover certain generic features of invention common to the structure disclosed herein and that of my pending application, Ser. No. 467,107, in which they are broadly claimed.

In the drawings,—

Fig. 1 is a plan view, partly broken away, of my improvements connected with a disc plow;

Fig. 2 is also a plan view with some of the hitch and steering devices broken away and also the greater portion of the disc plow of Fig. 1 broken away,—the figure showing the rear end portion of a tractor with which the plow is connected through the use of my improvements;

Fig. 3 is a plan view of the improvements but on a slightly larger scale than the other figures and showing in dotted lines the hitch and steering devices in an adjusted position;

Fig. 4 is a view in side elevation of the hitch and steering devices; and

Fig. 4$^a$ is a view as seen from the line $x$—$x$ of Fig. 4 and illustrating the construction of the rocking cranked shaft that forms a member of the steering mechanism.

Referring to the several figures of the drawings,—A, B, and C indicate heavy bars arranged in overlapping relation, as shown in Fig. 1, and together constituting a diagonally arranged beam of an ordinary disc plow, the several discs that are shown being indicated by D, E, and F, each being connected in an ordinary manner to a turned end portion of one of the frame members mentioned, these turned end portions being respectively indicated by $a$, $b$, and $c$. At the forward end of this described beam is connected a transverse frame member, and at opposite sides of the frame are the usual furrow and land wheels which are respectively indicated by H and I, each of these wheels being so connected to the frame as to prevent the wheels having any swinging or turning movement relative to the frame. As shown, the furrow wheel H is carried by an axle J, and the land wheel by an axle J'. At the rear of the frame is secured a supporting and steering wheel K which, unlike the two other wheels, is capable of being swung with relation to the frame for steering purposes, such swinging being permitted by reason of a vertical portion of the axle of such wheel being journaled in the customary manner in the main frame of the machine. Inasmuch as the disc plow shown is of ordinary construction, it is not believed that a more detailed description of its parts is necessary here. Of course it will be understood that the plow is provided with the usual adjusting levers and segments, but such parts as well as other ordinary features of construction are not necessary to be described as they form no part of my improvements nor do they contribute to the operation of such improvements.

Referring now to the connecting and guiding means with which my invention is particularly concerned,—5 indicates a heavy hitch member in the form of a bar which, in the construction shown, (see Fig. 4) is best formed of an upper and lower member suitably spaced apart and bolted together in parallel relation. At its rear end this bar is pivotally connected by a vertical pivot at 7 to a block 6 that in turn is pivotally connected by a horizontal pivot to the forwardly-projecting flange of an angle iron bracket 8 bolted to a transverse bar 9 that is secured in any suitable manner to the forward part of the main frame of the implement. A heavy diagonal bar 10 cooperates with the hitch member 5 to form a hitch device between the implement and the tractor. The rear end of this diagonal bar 10 is pivotally connected with the implement frame by means, comprising vertical and horizontal pivots, the same as those shown and described for the connection of the rear end of the hitch member 5. In the forward portion of the diagonal bar 10 are formed a plurality of holes 14 through any one of which and a hole in the bar 5 a bolt 15 is adapted to be inserted and secured, thus securing the two members 5 and 10 rigidly together and securely holding the forward end portion of the draft member 5 in any of its laterally-adjusted positions. The diagonal bar 10, in the construction shown, projects between the two spaced-apart members of the bar 5 as shown in Fig. 4. The pivotal connections of the bars 5 and 10 with their respective blocks are in transverse alinement, and the connections of such blocks with their respective brackets are also in alinement, and hence the bars 5 and 10 when not secured together by the bolt 15 are capable of being turned laterally when it is desired to adjust them for the purpose of varying the position of the attached implement, and can also when connected together rise and fall as required when the machine is passing over uneven ground. The double joint comprising the vertical and horizontal pivots hereinbefore described that is thus provided between the rear end portions of the two members of the hitch device and the implement provides in effect a universal connection or coupling of the implement with these two members. In the accompanying drawings the forward end of the hitch bar 5 is shown as pivotally connected by a bolt 16 to the rear end of a draft connection in the form of a coupling link 17 that is adjustably secured at its forward end in any one of a series of holes 18 in the usual transverse coupling plate with which a tractor is ordinarily provided—the tractor referred to being here indicated generally by the reference letter O. Extending laterally from the rear portion of the coupling link 17 is an arm 20 that is secured fixedly to the link by means of a rivet 21 and the bolt 16 before referred to, as best shown in Fig. 4. However, if desired the hitch bar 5 may be connected directly to the transverse coupling plate of the tractor, in which case such coupling plate would serve as the equivalent of the arm 20.

Turning now to the means by which the steering of the implement is effected so that it will properly follow the tractor as such tractor deviates from a straightforward line of travel, 22 indicates a short shaft adapted to rock about a horizontal axis, it being journaled in the upper ends of two similar arms 23 which, in the construction shown, are bolted to the cross bar 9 of the frame, and project upwardly and forwardly therefrom. At its ends the short shaft 22 is provided with turned portions that form cranks which are respectively indicated by 24 and 25, such crank portions extending in opposite directions, the crank numbered 24 being extended in a downward direction. This downwardly extending crank 24 is connected with the outer end of the laterally projecting arm 20 by means that lie approximately parallel with the hitch bar 5. It will be understood that in the event the hitch bar 5 is connected directly to the transverse coupling plate of the tractor, the connecting means from the crank 24 is also to be connected directly to the transverse coupling plate of the tractor, but at a point eccentric to the pivot between the hitch bar 5 and the transverse coupling plate. The connecting means, which constitutes a power transmitting device, in the construction shown is formed of two principal parts so as to provide between them certain spring members. The two principal parts of such power transmitting device are, as here shown, a rod member 26 and a flat plate-like member 27, the rod member at its rear end being turned to pass through an opening in a block 26$^a$ that is loosely mounted upon the lower end of said crank member 24, such turned end being secured to the block by means of a cotter pin, as shown, and the block itself being held to the crank member 24 by another cotter pin (see Fig. 4). The forward portion of the rod member 26 overlies the flat or plate member 27 and is held to such member by passing through a hole in the upturned rear end 28 of such member 27, and also by passing loosely through a small bracket 29 that is secured to the upper face of the plate member. This construction, of course, would permit a relative longitudinal movement between the parts 26 and 27, and, therefore, to maintain the parts in proper position and at the same time provide means that will yield slightly and thus act as buffers to prevent injurious results to any parts of the apparatus I place upon the rod member 26 two stout coiled springs indicated by 30 and 31, respectively, which are located upon opposite sides of the upturned end of the member 27, against which upturned end one end of each of the springs bears, the other ends bearing respectively against fixed collars 32 and 33 on the rod member. To the outer end of the other crank, 25, of the short shaft 22 is connected a long link 34, the connection being, in the construction shown, by means of a hook formed on the forward end of such link and an eye formed on the outer end of the crank 25, but of course, these two parts might be otherwise suitably connected together. This link 34 extends back over the implement and is suitably connected by a hook and eye connection as shown, or otherwise, to the outer end of an arm 35 that is fixedly secured to the upper end of the vertical portion of the axle of the steering wheel K and projecting laterally from such vertical axle portion.

It will be understood that the hitch bars 5 and 10 can be secured in different relative positions according to which of the series of holes 14 in the bar 10 the bolt 15 passes through, and that in each different adjustment that is made the implement will move along behind the tractor in a parallel but different path from that in which it will move with the said bolt in any of the other holes 14. Thus as shown by dotted lines in Fig. 3, wherein a somewhat extreme adjustment is had which may be advantageously employed when the plow is used in orchard work, for example, the implement may be held at a considerable distance to the left of that which it would occupy when the hitch device is in the position there shown in full lines. In whatever adjusted position these members may be in, the fact that they are connected to the implement at points spaced a considerable distance apart, and that such two members are securely connected together, ensures a straightforward line of progression of the implement. This lateral adjustment of the hitch does not, however, actuate or modify the operation of the steering mechanism, owing to the fact that the power transmitting device comprising the rod 26 maintains its parallel relation to the hitch bar 5 regardless of any lateral adjustment of the latter, and consequently the arm 20 is not rocked by such lateral adjustment, and does not rock the shaft 22.

In case of a deviation of the tractor from a straight line, as when turning a corner or avoiding an obstruction or in any other case, my improved steering means will automatically compel a corresponding movement of the plow, because such deviation of the tractor will cause a turning movement of the transverse coupling plate relative to the hitch bar 5 and impart either a pull or a push, depending upon which way the tractor turns, to the power transmitting device 26, 27 that is coupled with the tractor and extends to the crank 24 of the shaft 22.

Such movement of course, rocks the shaft 22 in its bearings about a transverse horizontal axis, and thus causes, through the long link 34, a push or a pull on the arm 35 that is fixedly secured to the axle of the supporting and steering wheel K, and the lateral turning of that wheel, of course, compels, as will be understood, the steering of the implement to one side or the other of its former path. The coiled springs 30 and 31 that are interposed between the members of the power transmitting device 26, 27 prevent damage that might be caused to parts of the mechanism during a backing operation of the tractor that would tend to turn the cranked rock-shaft more than would otherwise be permitted. Whenever the tractor is moving straight ahead any tendency of the implement to swerve from a straightforward path will be automatically and promptly counteracted by the described steering means regardless of whether the trailing implement is following directly behind the tractor or has been adjusted laterally to one side or the other of such position.

What I claim as my invention and desire to secure by Letters Patent, is—

1. The combination with a wheeled frame comprising a dirigible wheel, and a rigid hitch device connected with said frame to swing vertically and adapted to be connected at its forward end with a tractor, of a transversely disposed rocking member supported by the frame and movable about a substantially horizontal axis, a steering connection between the rocking member and the dirigible wheel, for steering said wheel, and means for actuating the rocking member by the turning of the tractor relatively to the hitch device.

2. The combination with a wheeled frame comprising a dirigible wheel, and a hitch device connected with said frame and adjustable to shift laterally the point of application of the draft thereto, said hitch device being adapted to be connected at its forward end with a tractor, of a rocking member mounted to rock about a substantially horizontal axis, a steering connection between said rocking member and the dirigible wheel, for steering said wheel, and means actuated by turning of the tractor relatively to said hitch device, for actuating said rocking member to steer the dirigible wheel.

3. The combination with a wheeled frame comprising a dirigible wheel, and a hitch device connected with said frame including a hitch member adjustable to shift laterally the point of application of the draft thereto, said hitch device being adapted to be connected at its forward end with a tractor, of a transversely disposed rocking member, a steering connection between said rocking member and the dirigible wheel, for steering said wheel, and means connected with said rocking member and supported in substantial parallelism with said hitch member regardless of the lateral position of the latter, and adapted to be actuated by the turning of the tractor relatively to the hitch device to actuate said rocking member to steer the dirigible wheel.

4. The combination with a wheeled frame comprising a dirigible wheel, a hitch device connected with said frame including a hitch member, and a draft connection for said hitch member adapted to be connected with a tractor, of a rocking member adapted to rock about a transverse axis, a steering connection between said rocking member and the dirigible wheel, for steering said wheel, and a power transmitting device connected with said draft connection and with said rocking member, and actuated by turning of the tractor relatively to said hitch device for actuating said rocking member to steer the dirigible wheel, said hitch member being adjustable to shift laterally the point of application of the draft to the frame and to move said power transmitting device simultaneously laterally in substantial parallelism therewith.

5. The combination with a wheeled frame comprising a dirigible wheel, a hitch device connected with said frame including a hitch member adjustable to shift laterally the point of application of the draft thereto, and a draft connection adapted to connect said hitch device at its forward end with a tractor, of a transversely disposed rocking member mounted on the frame, a steering connection between said rocking member and the dirigible wheel, for steering said wheel, and a power transmitting device comprising spring cushioned endwise movable members connected respectively with said rocking member and with said draft connection in substantial parallelism with said hitch member and actuated by turning movement of the tractor relatively to the hitch device, to rock said rocking member to steer the dirigible wheel.

6. The combination with a wheeled frame comprising a dirigible wheel, a draft connection, a hitch device pivotally connected with said frame and adjustable to shift laterally the point of application of the draft thereto, and means for holding said hitch device in its different positions of adjustment, of a rocking member mounted on the frame, a steering connection between said rocking member and the dirigible wheel, for steering said wheel, and means connected with said draft connection and with said rocking member, and shiftable laterally with said hitch device, and operating in the different adjusted positions of said hitch device to hold said dirigible wheel in its normal position when the draft is straight ahead, and to turn said wheel laterally when the line of draft is inclined laterally.

7. The combination with a wheeled frame comprising a dirigible wheel, a draft connection, a hitch device pivotally connected with said frame, including a hitch member adjustable to shift laterally the point of application of the draft thereto, and means for holding said hitch member in its different positions of adjustment, of a rocking member mounted on the frame, a steering connection between said rocking member and the dirigible wheel, for steering said wheel, and a power transmitting device connected with said draft connection and with said rocking member, and movable endwise by lateral deflection of the line of draft, for rocking said rocking member to steer said dirigible wheel, said power transmitting device being shiftable laterally independently of endwise movement thereof by lateral shifting of the hitch device.

8. The combination with a wheeled frame comprising a dirigible wheel, a hitch device connected with said frame, including a hitch member adjustable to shift laterally the point of application of the draft thereto, means for holding said hitch member in its different positions of adjustment, and a draft connection pivoted to rock laterally relatively to said hitch device for applying draft power thereto, of a rocking member mounted on the frame, a steering connection between said rocking member and the dirigible wheel, for steering said wheel, and a power transmitting device interposed between said draft connection and said rocking member, said power transmitting device being adjustable with said hitch member, and operating in the different adjusted positions of said hitch member to hold said dirigible wheel in its normal position when the draft is straight ahead, and to turn said wheel laterally when the line of draft is deflected laterally.

9. The combination with a wheeled frame comprising a dirigible wheel, a hitch device connected with said frame, including a hitch member adjustable to shift laterally the point of application of the draft thereto, means for holding said hitch member in its different positions of adjustment, and a draft connection pivoted to rock laterally relatively to said hitch member, for applying draft power thereto, of a rocking member mounted on the frame to rock about a substantially horizontal axis, a steering connection between said rocking member and the dirigible wheel, for steering said wheel, and a power transmitting device interposed between said draft connection and said rocking member, said power transmitting device being adjustable with said hitch member, and operating in the different adjusted positions of said hitch member to hold said dirigible wheel in its normal position when the draft is straight ahead, and to turn said wheel laterally when the line of draft is deflected laterally.

10. The combination with a wheeled frame comprising a dirigible wheel, a rigid hitch device connected with said frame and adjustable laterally at its forward end, and a draft connection pivotally connected with the forward end of said hitch device, and having a laterally extended rigid arm of a rock shaft mounted to rock about a transverse axis, cranks on said rock shaft, a connection between one of said cranks and said dirigible wheel, for steering said wheel by the rocking of said rock shaft, and a power transmitting device comprising spring cushioned endwise movable members connecting the other of said cranks with the laterally extending arm of said draft connection.

11. The combination with a wheeled frame comprising a dirigible wheel, a hitch device connected with said frame including a hitch member adjustable to shift laterally the point of application of the draft thereto, and a laterally extended draft connection at the forward end of said hitch device, of a rock shaft supported by the frame, cranks on said rock shaft, a connection between one of said cranks and said dirigible wheel, for steering said wheel by the rocking of said rock shaft, and a power transmitting device connecting the other of said cranks with said draft connection and operable to actuate the same by lateral deflection of the line of draft, said power transmitting device being mounted to maintain a position of substantial parallelism with said hitch member in the different adjusted positions thereof with respect to the frame.

12. The combination with a wheeled frame comprising a dirigible wheel, a rigid hitch device connected with said frame, and a laterally extended draft connection at the forward end of said hitch device for connecting the same with a tractor, of a rocking member mounted on the frame, a steering connection between said rocking member and the dirigible wheel, for steering said wheel, and a power transmitting device between said draft connection and said rocking member, comprising telescopically associated members and resilient means interposed between said telescoping members, for rocking said rocking member by lateral deflection of the line of draft.

13. The combination with a frame, wheels at opposite sides thereof, means for holding said wheels against lateral movement with respect to the frame, a steering wheel at the rear of said frame, a rigid hitch device connected with said frame, and a laterally extended draft connection for connecting said hitch device with a tractor, of a rock shaft mounted to rock about a transverse axis, cranks on said rock shaft, a steering connection between one of said cranks and said steering wheel, for steering the same, and a power transmitting device between the other of said cranks and said draft connection, for rocking said shaft by lateral deflection of the line of draft.

14. The combination with a wheeled frame comprising a dirigible wheel, a hitch member connected with said frame to swing laterally, to shift laterally the point of application of the draft to the frame, and means for holding said hitch member in different relative laterally adjusted positions, of a rocking member mounted on the frame, a steering connection between said rocking member and the dirigible wheel, for steering said wheel, and a power transmitting device connected with said rocking member and actuated by change of direction of the line of draft to rock the same, said power transmitting device being arranged to swing laterally with said hitch member without actuating said rocking member.

15. The combination with a frame, a dirigible wheel supporting said frame at the rear, a hitch device comprising a rigid hitch member pivotally connected with the frame to swing laterally, means for holding said hitch member in its different positions of adjustment, and a laterally swinging link for connecting said hitch device with a tractor, of a rock shaft mounted on the frame to rock about a transverse axis, a steering connection between said rock shaft and said dirigible wheel, for steering said wheel, and a power transmitting device connecting said link with said rock shaft and actuated by lateral deflection of the line of draft to rock said rock shaft to steer said wheel.

16. The combination with a frame, a dirigible wheel supporting said frame at the rear, a hitch device comprising a rigid hitch member pivotally connected with the frame to swing laterally, means for holding said hitch member in its different positions of adjustment, and a laterally swinging link for connecting said hitch device with a tractor, said link having a rigid arm projecting laterally therefrom, of a rock shaft supported by the frame and having cranks, means connecting one of said cranks with said dirigible wheel, for steering said wheel, and means connecting the other crank with said rigid arm, for actuating said rock shaft by lateral deflection of the line of draft.

17. The combination with a frame, a dirigible wheel supporting said frame at the rear, a hitch device comprising a rigid hitch member pivotally connected with the frame to swing laterally, means for holding said hitch member in its different positions of adjustment, and laterally extended means for pivotally connecting said hitch device with a tractor, of a rock shaft journaled on the frame and having oppositely extending cranks, a connection between one of said cranks and said dirigible wheel, for steering said wheel, and a connection between the other crank and said laterally extended means for actuating said rock shaft by change of direction of the line of draft.

WILLIAM L. PAUL.